United States Patent
Medvinsky et al.

(10) Patent No.: US 12,244,721 B2
(45) Date of Patent: *Mar. 4, 2025

(54) ADVANCED CRYPTO TOKEN AUTHENTICATION

(71) Applicant: ARRIS Enterprises LLC, Suwanee, GA (US)

(72) Inventors: Alexander Medvinsky, San Diego, CA (US); Lex Aaron Anderson, Auckland (NZ)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/377,248

(22) Filed: Oct. 5, 2023

(65) Prior Publication Data

US 2024/0179005 A1 May 30, 2024

Related U.S. Application Data

(63) Continuation of application No. 17/075,240, filed on Oct. 20, 2020, now Pat. No. 11,811,939, which is a
(Continued)

(51) Int. Cl.
*H04L 9/32* (2006.01)
*H04L 9/06* (2006.01)
(Continued)

(52) U.S. Cl.
CPC .......... *H04L 9/3234* (2013.01); *H04L 9/0631* (2013.01); *H04L 9/0643* (2013.01);
(Continued)

(58) Field of Classification Search
CPC ... H04L 9/3234; H04L 9/0631; H04L 9/0643; H04L 9/0844; H04L 9/16; H04L 9/3066;
(Continued)

(56) References Cited

U.S. PATENT DOCUMENTS

| | | |
|---|---|---|
| 8,751,822 B2 | 6/2014 | Anderson |
| 2012/0042170 A1* | 2/2012 | Curtin ............ G06F 21/77 713/185 |

(Continued)

OTHER PUBLICATIONS

B. Barak, et al., On the (im)possibility of obfuscating pro-grams. Journal of the ACM, 59(2):1-48, Apr. 2001. ISSN 00045411. doi: 10.1145/2160158.2160159. URL http://dl.acm.org/citation.cfm?doid=2160158.2160159.

(Continued)

*Primary Examiner* — Mohammad W Reza
(74) *Attorney, Agent, or Firm* — Chernoff, Vilhauer, McClung & Stenzel, LLP

(57) ABSTRACT

A system and method for authenticating an application that employs cryptographic keys and functions is provided with white box cryptography employed to secure the application, and to secure communications with the application. The white box includes a transformation of the application and the keys. A secure channel between the white box and a crypto token is used for communications. In some cases, the transformed keys can be employed in authenticating the white box to the crypto token. The presence of a valid crypto token can be periodically determined. In the presence of a valid crypto token, the white box can provide a verifiable message to a remote server. The remote server can verify the message and initiate a service.

10 Claims, 6 Drawing Sheets

Related U.S. Application Data continuation of application No. 15/805,397, filed on Nov. 7, 2017, now Pat. No. 10,812,269.

(51) Int. Cl.
   *H04L 9/08* (2006.01)
   *H04L 9/16* (2006.01)
   *H04L 9/30* (2006.01)

(52) U.S. Cl.
   CPC .............. *H04L 9/0844* (2013.01); *H04L 9/16* (2013.01); *H04L 9/3066* (2013.01); *H04L 9/3213* (2013.01); *H04L 9/3226* (2013.01); *H04L 9/3242* (2013.01); *H04L 9/3247* (2013.01); *H04L 2209/16* (2013.01)

(58) Field of Classification Search
   CPC ... H04L 9/3213; H04L 9/3226; H04L 9/3242; H04L 9/3247; H04L 2209/16
   See application file for complete search history.

(56) References Cited

U.S. PATENT DOCUMENTS

| | | | |
|---|---|---|---|
| 2016/0182472 A1* | 6/2016 | Michiels | H04L 63/0876 713/171 |
| 2016/0218872 A1 | 7/2016 | Anderson | |
| 2017/0244677 A1* | 8/2017 | Lee | H04L 9/002 |

OTHER PUBLICATIONS

O. Billet, et al., "Cryptanalysis of a white box AES Implementation", in Selected Areas in Cryptography, vol. 3357, pp. 227-240, Springer 2005.

S. Chow, et al., "White-Box Cryptography and an AES Implementation", in Selected Areas in Cryptography, pp. 250-270, Springer 2003.

Y. De Mulder, et al., "Revisiting the BGE Attack on a White-Box AES Implementation", eprint.iacr.org, 2013. URL http://eprint.iacr.org/2013/450.pdf.

S. Garg, et al., "Candidate Indistinguishability Obfuscation and Functional Encryption for All Circuits", Proc. of FOCS . . . , 2013. URL http://redirect.subscribe.ru/_/-/eprint.iacr.org/2013/451.pdf.

S. Goldwasser, et al., "On Best-Possible Obfuscation", In Theory of Cryptography, pp. 194-213. Springer, 2007.

T. Lepoint, et al., "Another Nail in the Coffin of White-Box AES Implementations", eprint.iacr.org, 2013. URL http://eprint.iacr.org/2013/455http://eprint.iacr.org/2013/455.pdf.

R. Mirabella, "License Management: How Developers Control Software Licensing", Retrieved Apr. 17, 2010.

A. Villegas, et al., "Network assisted content protection architectures for a connected world", Bell Labs Technical Journal, 16(4):85-96, 2012. ISSN 10897089. doi: 10.1002/bltj.20535.

A.F. Webster, et al., "On the design of S-boxes", In Advances in Cryptology-CRYPTO'85, p. 523. Springer, 1986.

B. Wyseur, "White Box Cryptography: Hiding Keys in Software", Nagra Kudelski Group, 2012, pp. 1-9.

* cited by examiner

ADVANCED CRYPTO TOKEN AUTHENTICATION

CROSS-REFERENCE TO RELATED APPLICATIONS

The present application is a continuation of U.S. patent application Ser. No. 17/075,240 filed on Oct. 20, 2020, which is a continuation of U.S. patent application Ser. No. 15/805,397 filed on Nov. 7, 2017, now U.S. Pat. No. 10,812,269, the contents of which are incorporated by reference herein.

TECHNICAL FIELD

The present disclosure relates to the field of secure digital communications, particularly systems and methods that provide authentication amongst communicating entities, thereby preventing inappropriate communications and/or other transactions.

BACKGROUND

Cryptographic tokens can be connected to computing systems and employed to establish a high level of user authentication. Some cryptographic tokens (crypto tokens) can be plugged into a computer via a convenient interface, such as a USB interface, a Smart Card interface, or others. In some typical embodiments of such systems, a user enters a PIN (personal identification number) code or a password. The crypto token validates that entry, and based on that validation, the crypto token can subsequently be employed to sign and/or encrypt messages for delivery to an application. The application can be local or remote.

For example, a crypto token can be employed in combination with SSL or TLS protocols to secure HTTP or web browsing sessions. A user can plug a crypto token into a client computer and then type into the computer a PIN code (pincode) corresponding to the crypto token. The crypto token can subsequently be employed to perform digital signatures as part of SSL and/or TLS handshake protocols. In this manner, the user can be strongly authenticated to a web site to enhance security. Web sites such as online stores and those providing online banking services are examples of some web sites that can benefit from such authentication.

FIG. 1 depicts some elements of such systems. User 100 can interact with a computing system 102, such as by a physical interface 101. The computing system can comprise software elements such as application 103. A crypto token 105 can be communicatively coupled 106 with the computing system 102 and elements within the computing system such as an application 103. Coupling 106 between the computing system 102 and crypto token 105 can comprise an interface such as a USB interface, a Smart Card interface, or others. The computing system 102 can also be communicatively coupled 108 with a remote server 107. In some embodiments, the crypto token 106 can be employed to sign and/or encrypt messages for delivery to an application or service provided by remote server 107.

Many problems can arise when a user authenticates with just a password. Authentication is at risk from direct theft of the password, and by hacking of the password, such as by a successful dictionary attack. Authorized use of the password can be subverted by intentional sharing of the password. For content providers, intentional sharing can be particularly troublesome. In a Pay TV over the Internet scenario, an individual password shared among many individuals can enable access to Pay TV content without a corresponding payment.

Use of a physical crypto token can address weaknesses of a password-only approach. A crypto token physically restricts use to one user at a time, and is not readily reproduced. Further, as long as the user does not share the crypto token's password, the crypto token cannot be used by others, even if the physical crypto token is lost or stolen. Hacking attacks such as a dictionary attack to determine a password can be very effectively discouraged; crypto tokens can be configured to lock out and stop functioning after a small number of invalid attempts to enter a pincode.

These known uses of crypto tokens can work well for user authentication. However, this approach can be troublesome for machine or computer authentication. Consider applications in which a crypto token 105 is plugged into a computer 102 to identify that computer as trusted and authorized to access some network services. In many scenarios, a machine runs an application and is very rarely attended by a user. It can be impractical to require a user to walk over and type in a pincode each time that the application and/or computer restarts. Such installations may be required to be very robust, including the feature of automatic reboot and recovery from a power loss without need of a user's presence 101 at that location.

Alternatively, in place of a user entering the pincode, a pincode can be hardcoded and instantiated in the software. However, software on a general-purpose computer, even when present only in binary form, can be straightforwardly dissected. Systems and methods to analyze, reverse engineer and then extract such a secret pincode are available. Some of those systems and methods may be successful with relative ease and speed. Further, since the pincode is sent over an interface 106 comprising a clear physical link such as a USB interface, the pincode can simply be observed and recorded via that link, even without reverse engineering any software. Once the pincode of a crypto token is compromised, it can be utilized with unauthorized software on the same or a different computer with the same token.

Current known standard interfaces for crypto token systems include PKCS #11 API (also known as CryptoKi). Such interfaces include one or more user secrets that need to be sent to the crypto token over a clear, nonsecure, physical link. Such interfaces may be employed successfully for some user authentication scenarios, but the security of their communications and/or operations may be straightforwardly defeated in machine or computer authentication scenarios.

Some alternative approaches for machine authentications are known in the art, but require one or more users to be present. In some cases a user has to be present to enter a pincode. In other cases multiple users must be present so that multiple user codes can be supplied in order to activate a crypto token. Such solutions are not applicable in many production factory environments, where it is impractical to have one or more users attend and enter a pincode each time that a computer and/or application restarts. A single factory can typically comprise many such production lines. In many such cases, it is impractical to require one or more users to attend to and enter pincodes on a large quantity of computers within a factory following a temporary power outage.

Therefore, improved systems and methods for authenticating an application to a crypto token are needed. In particular, systems and methods are needed that avoid passing a clear pincode over a physical clear link.

Thus, systems and methods are needed that prevent straightforward dissection of the software cryptographic functions and keys employed for authentication of machines and/or applications.

Thus, improved systems and methods are needed to provide machine and/or application authentication, without requiring the presence of one or more users.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for authentication including the steps of: providing an application, the application including a cryptographic function and a key; transforming the cryptographic function and the key, thereby providing a white box including a transformed cryptographic function and a transformed cryptographic key; providing a crypto token, the crypto token coupled with the white box; providing a substantially secure channel between the white box and the crypto token; employing the substantially secure channel for communications between the white box and the crypto token; periodically determining presence of the crypto token; and, providing a verifiable message, responsive to the presence of the crypto token, thereby initiating a service. Other embodiments of this aspect include corresponding computer systems, apparatus, and computer programs recorded on one or more computer storage devices, each configured to perform the actions of the methods.

Implementations may include one or more of the following features. The method may also include where the cryptographic function includes asymmetrical cryptography employing a public/private key pair. The method may also include authenticating the white box to the crypto token, responsive to the transformed cryptographic key. The method may include the steps of: the white box computing a first public key corresponding to a first private key according to a Diffie-Hellman key agreement algorithm; the crypto token computing a second public key corresponding to a second private key according to the Diffie-Hellman key agreement algorithm; the white box computing a first value of a shared key responsive to the second public key and the first private key; and, the crypto token computing a second value of the shared key responsive to the first public key and the second private key; where the first and second values of the shared key are the same; and, where authenticating the white box to the crypto token is further responsive to the first public key and the second public key. The method may include the steps of: the white box computing a first public key corresponding to a first private key according to an Elliptic Curve Diffie-Hellman key agreement algorithm; the crypto token computing a second public key corresponding to a second private key according to the Elliptic Curve Diffie-Hellman key agreement algorithm; the white box computing a first value of a shared key responsive to the second public key and the first private key; and, the crypto token computing a second value of the shared key responsive to the first public key and the second private key; where the first and second values of the shared key are the same; and, where authenticating the white box to the crypto token is further responsive to the first public key and the second public key. The method may include where the cryptographic function includes symmetrical cryptography employing a common key. The method may include where the crypto token is configured to provide a token identifier corresponding to the crypto token within a signed digital certificate; and, where the white box is configured to validate the signed digital certificate and extract the token identifier. The method may include where the crypto token is further configured to provide a digital signature over a message; where the signed digital certificate includes a corresponding public key; and, where the white box is configured to verify the digital signature, responsive to the corresponding public key. The method may include the steps of: periodically performing a check, thereby providing a most recent check, where the check determines presence and validity of the crypto token; and, providing more than one verifiable message responsive to the most recent check. The method may include the steps of: the crypto token computing a first value of a message authentication code according to a HMAC-SHA256 algorithm; the white box computing a second value of a message authentication code according to the HMAC-SHA256 algorithm; and, determining a match of the first value and the second value; where the presence of the crypto token is indicated by the match. The method may include the steps of: the crypto token computing a first value of a message authentication code according to an AES-CMAC algorithm; the white box computing a second value of a message authentication code according to the AES-CMAC algorithm; and, determining a match of the first value and the second value; where the presence of the crypto token is indicated by the match. Implementations of the described techniques may include hardware, a method or process, or computer software on a computer-accessible medium.

BRIEF DESCRIPTION OF THE DRAWINGS

Further details of the present invention are explained with the help of the attached drawings in which.

DETAILED DESCRIPTION

Systems and methods are described herein for providing authentication of applications and/or machines, while addressing the challenges described above.

Figure 2:
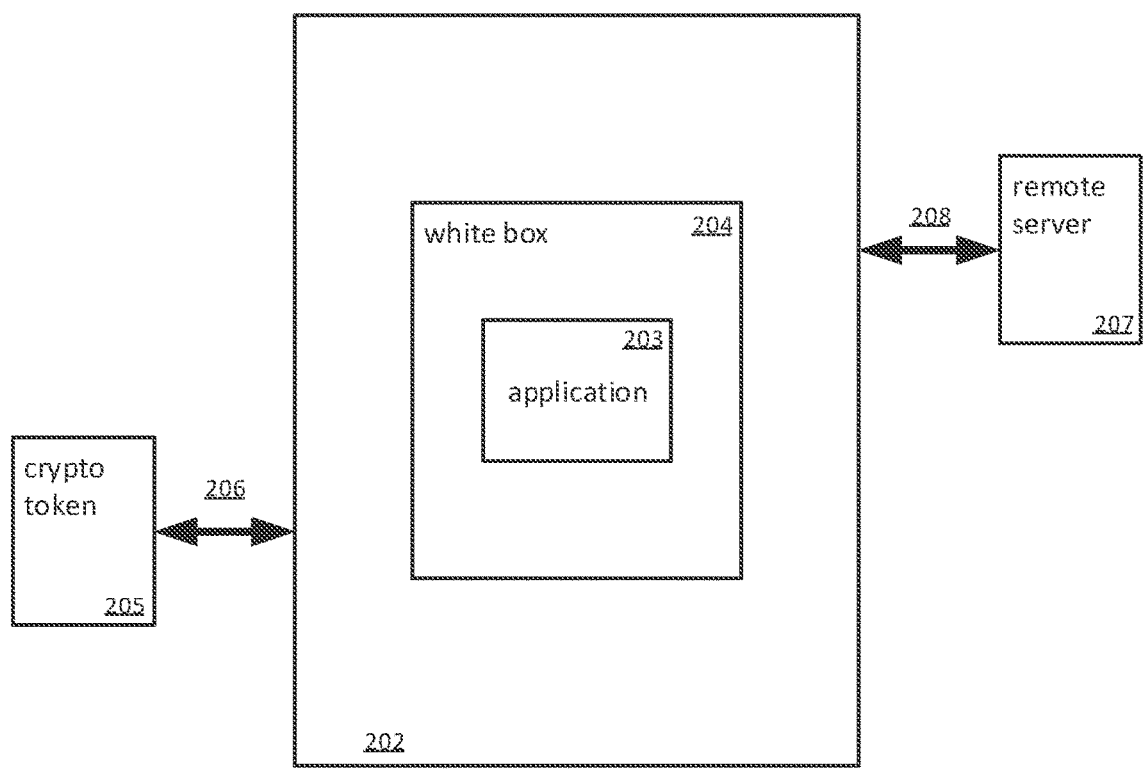
FIG. 2 depicts an exemplary embodiment for authentication employing a crypto token.

FIG. 2 depicts an embodiment for such authentication, employing a crypto token. An application 203 executing within a computing system 202 can employ a white box 204 to validate itself to the crypto token 205. White box 204 can comprise a software-based cryptographic construct providing mathematical transformation for both software implementing a cryptographic function, and, a cryptographic key. White box 204 functionality can take the form of a software library. By way of examples, such a software library can comprise static library functions and/or dynamically linked library functions. After the cryptographic key is transformed by a white box process, the system can be absent the raw form of the key. The transformation renders extremely difficult and unlikely any prospect of an adversary successfully reverse engineering the software in order to extract the key. Thus, security of the key is notably enhanced.

In some embodiments, an application 203 and/or white-boxed application 204 can detect its execution in a risky setting, such as within a debugger, and responsively discontinue and/or alter its execution, thus discouraging adversarial attempts at reverse engineering a key and/or elements of an application. White box cryptography provides systems and methods for securing executable programs, and can be inclusive of securing data and data structures corresponding to those executable programs. Implementations can provide securing of programs and data both prior to and during program execution. By way of example, source code can undergo white box cryptography transformations at compile time and further transformations of the program can occur during execution. In the embodiments described herein, a white box such as white box 204 can comprise systems and methods for transformation of programs and data both prior to and during program execution. For example, white box 204 can comprise a secured 'white-boxed' application 203 that can perform similar functions to a version of the application not thus secured.

Systems and methods for white box cryptography are well-known in the cryptographic arts. By way of example and not limitation, some systems and methods are disclosed in U.S. Pat. No. 8,751,822 "Cryptography Using Quasigroups" which further references many publications in the field.

Figure 1:
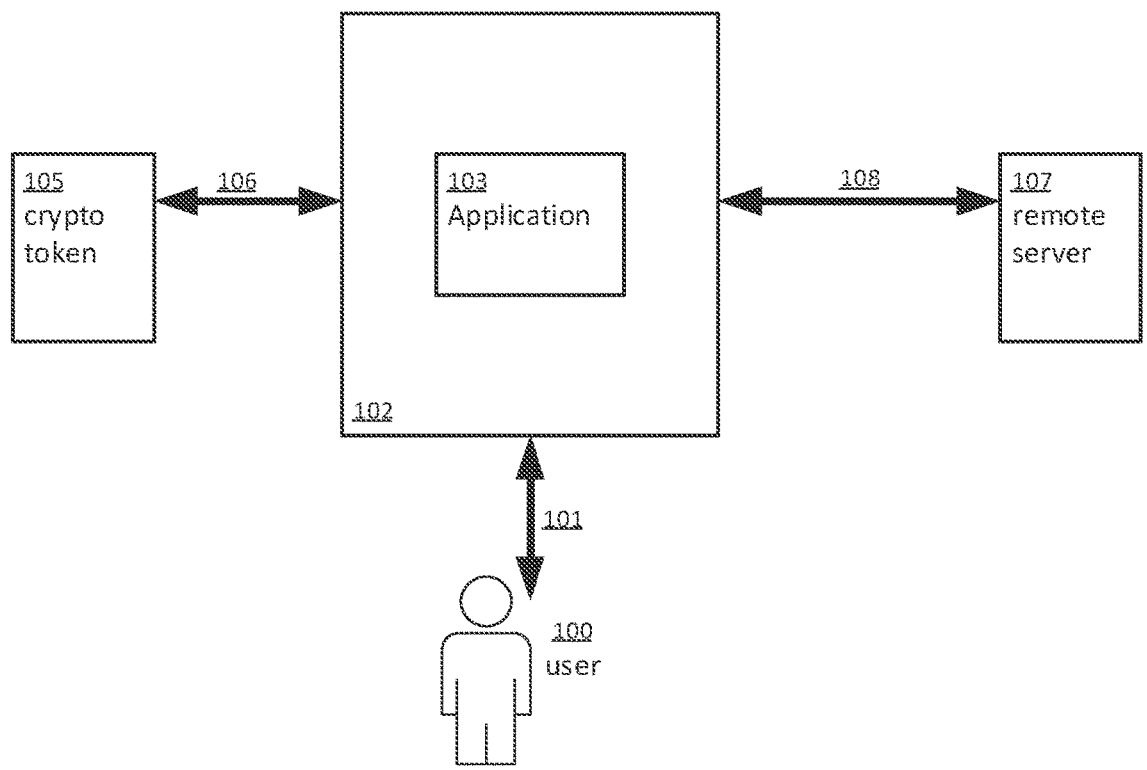
FIG. 1 depicts an embodiment for authentication with a user present.

Embodiments for authentication can employ cryptographic signatures and/or other techniques, thus avoiding exposure of secrets. For example, communications 206 between a computing system 202 and crypto token 205 can employ such cryptographic signatures and/or other cryptographic techniques. Communications 206 can comprise a secure channel. In some embodiments, communications 208 between computer system 202 and remote server 207 can employ such cryptographic signatures and/or other techniques. Thus scenarios that expose secrets can be avoided, such as can be described with regard to FIG. 1, in which a pincode can be provided 'in the clear' across a physical interface 101 from user 100 to computing system 102.

In some embodiments, messaging and/or other interactions between computing system 202 and remote server 207 can result from such techniques employed between other elements. For example, secure channel communications between computing system 202 and crypto token 206 can result in a message and/or a service request to remote server 207, and such messages and/or service requests can result in further messages and/or service provision by remote server 207.

The effectiveness of authentication can be enhanced by persistently engaging crypto token 205. Processes of computing system 202, such as application 203 and/or white-boxed 204 elements, can frequently require a successful interaction with crypto token 205 in order to continue operation. In short, crypto token 205 must remain plugged in. Processes of computing system 202 can thus quickly determine when the link 206 between crypto token 205 and computing system 202 is disrupted, such as by being unplugged, and responsively discontinue and/or otherwise alter execution.

Figure 3:
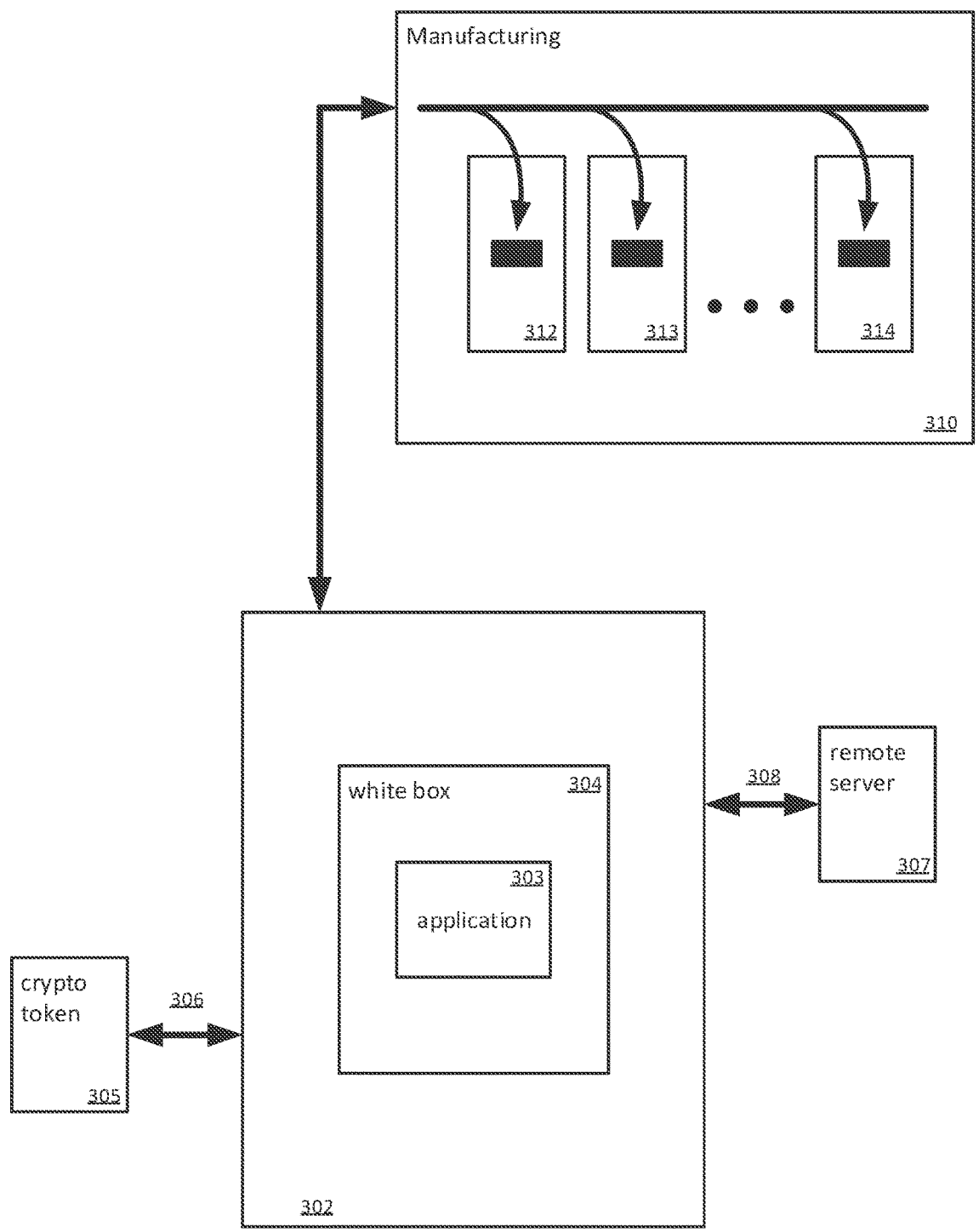
FIG. 3 depicts an exemplary production line embodiment for authentication employing a crypto token.

FIG. 3 depicts an exemplary production line embodiment for authentication employing a crypto token. The example is that of a programming station within a factory, for manufacturing a home premises device such as a set-top box. Elements computing system 302, application 303, white box 304, crypto token 305, interface 306, remote server 307, and communications 308 can function as the respectively corresponding elements are described and depicted with regards to FIG. 2. The programming station can comprise computing system 302, with the computing system 302 further comprising application 303 software and white boxed 304 keys and/or software. The programming station 302 can employ the crypto token 306 in providing messages that identify and authenticate the programming station to a remote server 307 key server located in the factory. After the key server 307 validates the programming station associated with a factory production line, that key server 307 can supply cryptographic device keys to the programming station 302. The programming station 302 can forward the keys to a set-top box 312, enabling programming of the set-top box 312 while at the factory. By way of examples and not limitation, cryptographic keys for the set-top device can comprise DRM client keys, copy protection keys that can protect digital outputs such as HDCP, keys for protecting HDMI outputs, and, DTCP-IP keys for protecting compressed content that can be transmitted over an in-the-home IP network.

In this scenario, the programming station 302 can be associated with a physical production line "Manufacturing" 310 in the factory. A production line can comprise numerous set-top boxes 312, 313, . . . , 314 in the process of manufacture. A requirement for the production line embodiment can be to prevent unauthorized programming stations on other production lines, or other factories, from requesting and subsequently loading these highly valuable device keys into unauthorized devices. Another requirement can be to prevent unauthorized software from successfully requesting keys from the key server. For example, the embodiment can be required to prevent unauthorized software from simply extracting the keys and posting them to the Internet for unauthorized use, instead of an authorized use of loading the keys into devices in the factory.

Figure 4:
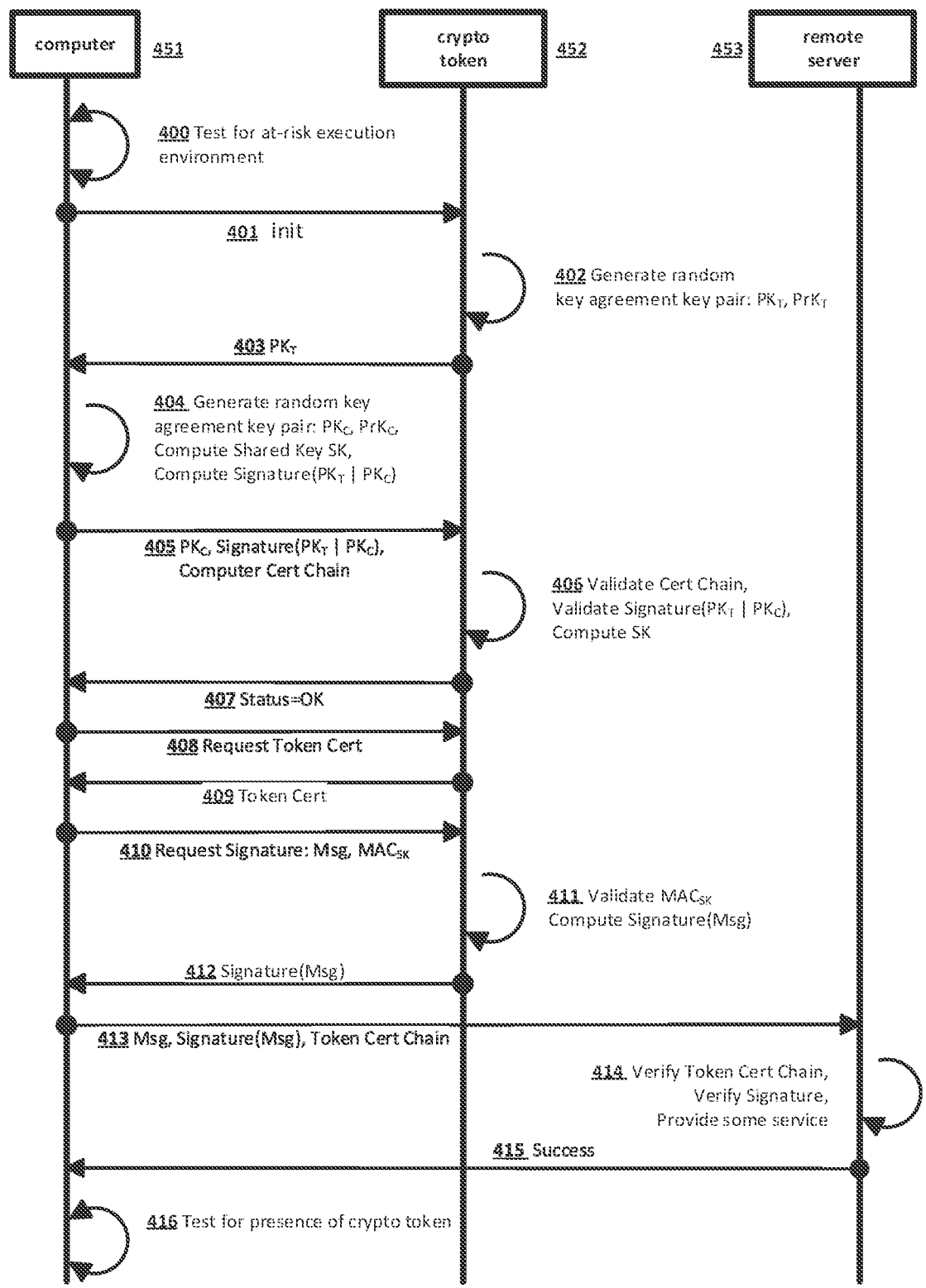
FIG. 4 depicts a use case diagram corresponding to symmetric authentication employing a crypto token.

FIG. 4 depicts embodiments for symmetric authentication employing a crypto token. In step 400, computer 451 can test for an at-risk execution environment, such as within a debugger. If such an at-risk condition is detected, computer 451 can responsively discontinue and/or alter further program execution. Notably, in some embodiments, this test and resulting control flow can be performed frequently and/or periodically, and to a large degree independently of other processes taking place on computer 451.

In step 401, computer 451 sends a message to the crypto token 452. The message, depicted as 'init,' comprises a request for a secure session. In step 402, crypto token 452 generates a random key agreement key pair: $PK_T$, $PrK_T$. $PK_T$ is the public key element of the pair. $PrK_T$ is the private key element of the pair. In step 403, crypto token 402 returns public key element $PK_T$ of the key agreement pair to computer 451. In step 404, an application on computer 451 can generates its own random key agreement public/private key pair: $PK_C$, $PrK_C$. $PK_C$ is the public key element of the pair. $PrK_C$ is the private key element of the pair.

The application can compute a shared key SK according to the selection of a specific key agreement algorithm. If a Diffie-Hellman key agreement algorithm is selected, the application generates $PK_T \wedge PrK_C$ mod p, where the symbol $\wedge$ represents exponentiation and "mod p" indicates modulus a large prime number p. If an Elliptic Curve Diffie-Hellman key agreement algorithm is selected, the application generates $PK_T * PrK_C$, where symbol "*" represents a special multiplication operation that is specifically defined for Elliptic Curves and well known in the art of cryptography. The application can then compute Signature ($PK_T|PK_C$), a signature over a concatenation of $PK_T$ and $PK_C$. Computation of the signature employs a separate signing private key of the computer, $PrSIG_C$. Such an application can implement both the key agreement algorithm and the signature algorithm of this step within a white box. Thus the key agreement private key $PrK_C$ and the signing private key $PrSIG_C$ are made unavailable in clear form, and relatively difficult to extract from the application.

In step 405, the application's key agreement public key $PK_C$ and computed signature Signature ($PK_T|PK_C$) can be sent from computer 451 to the crypto token 452, along with a certificate chain corresponding to the signing key $PrSIG_C$. The certificate chain can comprise a unique certificate corresponding to computer 451 comprising a signature verification public key $PKVER_C$. The certificate chain can further comprise certificates such as Subordinate Certificate Authority (Sub-CA) certificates.

In step 406, crypto token 452 can employ a pre-configured trusted Root Certificate Authority (Root CA) certificate to validate the computer's certificate chain. Upon successful validation, crypto token 452 can extract the public key $PKVER_C$ from a certificate, and use $PKVER_C$ to validate Signature ($PK_T|PK_C$). Upon completion of this validation, crypto token 452 can compute the same shared key SK as in step 404 according to the selection the same specific key agreement algorithm that is selected in step 404.

If a Diffie-Hellman key agreement algorithm is selected, the application generates $PK_C \wedge PrK_T$ mod p, where the symbol $\wedge$ represents exponentiation and "mod p" indicates modulus a large prime number p. If an Elliptic Curve Diffie-Hellman key agreement algorithm is selected, the application generates $PK_C * PrK_T$, where symbol "*" represents a special multiplication operation that is specifically defined for Elliptic Curves and well known in the art of cryptography.

In step 407, crypto token can 452 return a successful status, depicted as "OK," to computer 451 and application. In step 408, the application on computer 451 issues a request "Request Token Cert" to crypto token 452 for the digital certificate corresponding to the crypto token 452. Once received, the crypto token's digital certificate can subsequently be employed to validate messages that have been signed by crypto token 452. In step 409, crypto token 452 returns its corresponding digital certificate "Token Cert" to computer 451. This digital certificate has previously been signed by a trusted Certificate Authority, thus additional authentication to this message is not required.

In step 410, computer 451 undertakes sending a message to a remote server. The message can comprise a request for a restricted service, with that restricted service requiring client authentication. A request from computer 451 to the crypto token 452 can comprise a message "Msg" constructed by the computer 451, and, a Message Authentication Code (MAC). The MAC can be computed over shared key SK, and is shown as $MAC_{SK}$. The computer's request "Request Signature: Msg, $MAC_{SK}$" is sent to crypto token 452 for signing. $MAC_{SK}$ indicates to crypto token 452 that the application requesting message signing is the same application that was previously validated by crypto token 452.

In step 411, crypto token 452 validates $MAC_{SK}$, using the same value of SK. Crypto token 452 computes the requested signature for the message Signature (Msg). In step 412, crypto token 452 returns the signature "Signature (Msg)" to computer 451. In step 413, an application on computer 451 can construct and provide a transmission comprising the message "Msg," signature "Signature (Msg)" and certificate chain "Token Cert Chain" employing the signature and certificate previously obtained from crypto token 452. The transmission to remote server 453 can comprise additional certificates, such as a Sub-CA certificate, as part of a complete certificate chain of the token. The transmission can be predicated on the authentication of and/or the presence of crypto token 452. That is, if crypto token 452 is not known to be present and/or authenticated, computer 451 can responsively discontinue and/or alter further program execution.

In step 414, remote server 453 validates the token certificate chain and signature. Upon successful validation, remote server 453 can provide and/or initiate a service that required authentication. In step 415, remote server 453 communicates a successful result "Success" to computer 451. This communication can comprise data corresponding to a service provided by remote server 453.

In some embodiments, step 416 can test for presence of crypto token 452. By way of example and not limitation, such a test can comprise simply verifying electrical connection between a physical crypto token 452 and computer 451. If a test fails, computer 451 can responsively discontinue and/or alter further program execution such as those of a computer 451 application depicted by steps of FIG. 4. Notably, in some embodiments, this test and resulting control flow can be performed frequently and/or periodically, and to a large degree independently of other processes taking place on computer 451.

In regard to FIG. 4, a cryptographic application and corresponding keys can be transformed by white box cryptography techniques known in the art, thereby providing a white box comprising a transformed cryptographic function and a transformed cryptographic key. Computer 451 can comprise the white box, as is depicted in FIG. 2 with a computing system 202 comprising a white box 204 and the white box embodying an application 203. Notably, the white box can comprise data and executable program that has been transformed prior to program execution. Further, data and executable program can undergo transformation during program execution. Some or all of the steps of FIG. 4 performed by computer 451 can be performed by the white box. Thus steps of FIG. 4 variously described as performed and/or interacting with computer 451 and/or the application can be described as performed and/or interacting with the computer 451 white box. Within FIG. 4, individual steps and/or combinations of steps can comprise one or more cryptographic functions and/or transformed cryptographic functions. By way of example, the steps comprise cryptographic functions corresponding to provisioning and use of a secure communication channel employing cryptographic techniques.

In FIG. 4, cryptographic functions comprise asymmetrical cryptography utilizing public/private key pairs. By way of example and not limitation, computer 451 and thus the white box of computer 451 employs such key pairs in step 404.

Steps 400 through 406 can be described as establishing, thus providing, a substantially secure channel between the white box and the crypto token. Those steps can serve to provide a session key SK corresponding to a secure session, to both crypto token 452 and computer 451. The steps depicting interactions and messaging between computer 451 and crypto token 452, subsequent to step 406, can be described as employing the substantially secure channel for communications between the white box and the crypto token.

In some embodiments, step 416 can periodically determine the presence of crypto token 452 by employing a straightforward check for connectivity between computer 451 and crypto token 452. In some embodiments, crypto token 452 presence can alternatively and/or additionally be determined by the success of other interactions and confirmations between computer 451 and crypto token 452, as depicted by many of the steps in FIG. 4. In an example, computations of step 404 depending from the receipt of PKT in step 403 may not progress absent the presence of crypto token 452 supplying PKT in step 403. In another example, the request of step 408 many not progress absent the presence of crypto token 452 supplying a successful status in step 407. In another example, the request of step 410 may not progress absent the presence of crypto token 452 supplying its digital certificate in step 409. In another example, the transmission of step 413 may not progress absent the presence of crypto token 452 supplying the requested signature Signature (Msg) of step 412. These alternative and/or additional interactions and confirmations can also be described as occurring periodically. In some embodiments a stronger check for the crypto token 452 may be added by having the token add a Message Authentication Code $MAC_{SK}$ to any message, computed with the shared key SK. The computer may validate $MAC_{SK}$ to be certain that not only a crypto token is still plugged-in, but that it has not been replaced by another token which does not share the same key SK.

In step 413, computer 451 can provide a verifiable message "Msg" that can serve to initiate provision of a service by remote server 453. Step 414 depicts operations for verifying the message. The transmission step 413 may require determination of the presence of crypto token 452 in order to progress. Thus provision of the verifiable message can be responsive to the presence of crypto token 452.

Notably, the method of steps 401-416 includes a protected signing key and digital certificate both on computer 451 and inside crypto token 452. However, in some such embodiments, only the signing key and certificate on the crypto token are utilized to sign messages for a remote server.

For some embodiments it can be assumed that the protection of the private key in the physical crypto token is greater than protection provided in the white box. If the white box is compromised, that could allow unauthorized use of the crypto token, resulting in damage. However, only a single copy of each physical crypto token exists, and that one copy is not readily duplicated by unauthorized parties.

In the event that a crypto token itself were compromised and the private key extracted out of the token, an unlimited number of copies of the corresponding private key and certificate could be made by unauthorized parties. Presumably this large number of copies could be employed to cause greater damage than would correspond to a single unauthorized copy. In either case, the peril of further damage is minimized when all affected crypto tokens are successfully revoked. In some embodiments, certificates corresponding to the compromised elements can be placed on a revocation list, and that revocation list employed to disallow further unauthorized use of the compromised elements.

Figure 5:
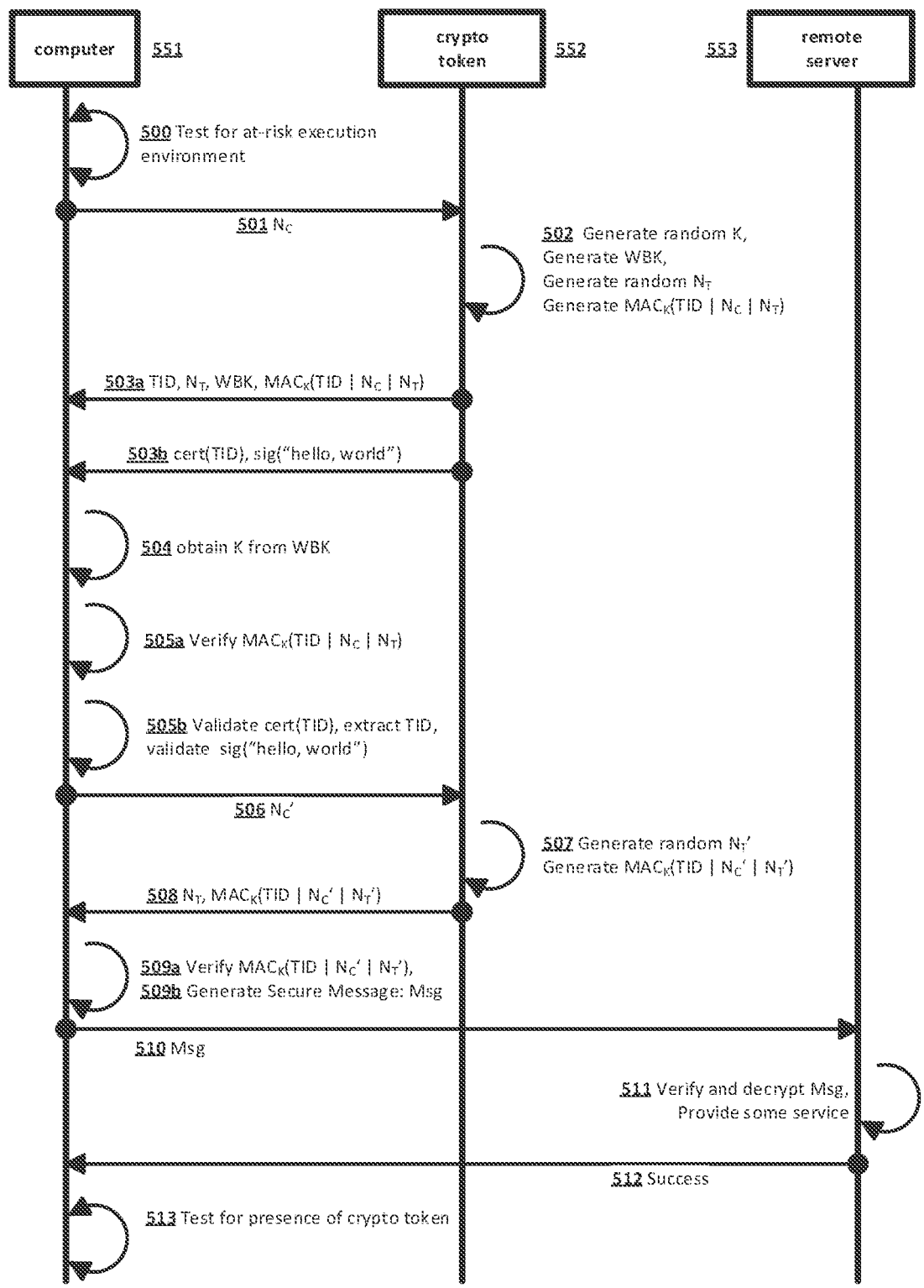
FIG. 5 depicts a use case diagram corresponding to asymmetric authentication employing a crypto token.

FIG. 5 depicts a use case employing symmetric authentication. In some embodiments, signature and/or other cryptographic operations can be performed relatively quickly in a software embodiment. Although protecting a private key in a white box embodiment may represent additional risk relative to other embodiments, a speed performance vs. risk tradeoff may be appropriate for some embodiments. In the use case described, application software can routinely and/or periodically check for the presence of a connected (e.g., plugged-in) crypto token, and requests for service can be restricted to the condition that the crypto token is present. In the event that a crypto token has been removed, a computer application can quickly detect the absence and cease further functions, such as requests for service. In some embodiments an application can be made relatively more tamper resistant through hidden functions that periodically validate the integrity of some or all of the application.

In step 500, computer 551 can test for an at-risk execution environment, such as within a debugger. If such an at-risk condition is detected, computer 551 can responsively discontinue and/or alter further program execution. Notably, in some embodiments, this test and resulting control flow can be performed frequently and/or periodically, and to a large degree independently of other processes taking place on computer 551.

In step 501, an application can generate $N_C$, a random value described as a nonce. Computer 551 provides $N_C$ to crypto token 552. In step 502, crypto token 552 generates several parameters. Crypto token 552 generates K, a random symmetric session key. In some embodiments the session key K can be according to an Advanced Encryption Standard (AES). Crypto token 552 generates WBK, a white box protected version of K. In some embodiments K can be encrypted using a symmetric key WB-SK (White Box Sealing Key), and the symmetric key can be present and hidden within a white box of a computer application. Subsequently, K may be decrypted within the application (during step 504) and at the same time (during decryption) mathematically transformed for use with a white box. Notably, encryption of K inside the token to create WBK can comprise standard crypto hardware and/or software implementations that do not involve a white box. In some embodiments, the white box transformation of K only occurs during decryption on the computer 551.

Crypto token 552 generates $N_T$, a random nonce corresponding to the crypto token 552. Crypto token 552 generates $MAC_K(TID|N_C|N_T)$, a message authentication code (MAC) computed with key K over a token identifier TID and nonces $N_C$ and $N_T$. In some embodiments a HMAC-SHA256 algorithm can be employed to provide $MAC_K(TID|N_C|N_T)$. In some embodiments an AES-CMAC algorithm can be employed to provide $MAC_K(TID|N_C|N_T)$.

In step 503a, crypto token 552 provides TID, $N_T$, WBK and $MAC_K(TID|N_C|N_T)$ to the computer 503 application. In embodiments comprising step 503b crypto token 552 can provide a digital certificate cert (TID) signed by a trusted Certificate Authority (CA) to computer 551. Optionally, cert (TID) can include a token identifier TID instead of the TID that is otherwise sent in step 503a. Furthermore, optionally a signature with the corresponding private key over a dummy message such as "hello, world" can be provided. A signature can serve to further confirm that the token is the owner of that certificate and has the corresponding private key.

In step 504, K can be obtained by decryption of WBK. While WBK is being decrypted, at the same time K can be constructed as transformed inside a white box implementation. In step 505a, computer 551 verifies $MAC_K(TID|N_C|N_T)$. The session key K (based on WBK) can be instantiated in the white box and employed to recompute the MAC. The recomputed MAC value can be verified to precisely match the MAC value provided by crypto token 552. Such verification can serve to assure the application of the presence of a valid and connected (e.g., plugged-in) crypto token. Recomputation of the MAC in this step can necessarily employ the same specific algorithm as employed to compute $MAC_K(TID|N_C|N_T)$ in step 502.

In some embodiments comprising step 503b, increased security can be provided by performing step 505b. In step 505b, computer 551 can validate the digital certificate cert (TID), extract TID from the certificate and ensure that this TID is identical to the value that was sent by the token in the message 503a. A relatively high degree of trust can be associated with this TID, because the TID is validated by a digital certificate that has been signed by a trusted Certificate Authority. Further validation of a token signature over a dummy message such as "hello, world" using the public key in that certificate can confirm that cert (TID) really belongs to this token and was not copied from another.

This certificate can be employed to ensure that each separate computer has been authorized with a valid crypto token plugged-in before the computer presents its own unique identity to remote services. A computer without such a crypto token can be configured to abort communications with the remote server, and, the crypto token can comprise specially designed hardware to prevent cloning. A further security enhancement can be provided when each crypto token is initialized with a unique WB-SK that is used to encrypt K to create WBK during the step 502. The application on the computer 551 in this case also can be uniquely generated such that it contains a white box based on a unique WB-SK. A thus uniquely generated application will not operate with any other crypto token, nor will it operate in the absence of a crypto token. Cloning of the certificate and private key of the computer application can be made more difficult by the white box and can be made even more difficult when WB-SK is unique. Such cloning may still be possible with a large effort and may be less difficult than cloning physical tokens, but in many embodiments this level of security can suffice while providing better performance.

In step 506, computer 551 application generates $N_C'$, a new random nonce value. $N_C'$ is sent from computer 551 to crypto token 552. In step 507, crypto token 552 generates $N_T'$, another random nonce corresponding to crypto token 552. Crypto token 552 also generates $MAC_K(TID|N_C'|N_T')$, a MAC computed with the previously established session key K over the token identifier TID and the two nonces $N_C'$ and $N_T'$.

In step 508, crypto token 552 provides $N_T'$ and the computed $MAC_K(TID|N_C'|N_T')$ to computer 551. Transmission of TID and a white box representation of the session key is not necessary, as those items are provided earlier and not changed. In step 509a, computer 551 verifies $MAC_K(TID|N_C'|N_T')$. As in step 505a, the session key K (based on WBK) can be instantiated in a white box and employed to recompute the MAC. The recomputed MAC value can be verified to precisely match the MAC value provided by crypto token 552. Such verification can serve to assure the application of the presence of a valid and connected (e.g., plugged-in) crypto token. In step 509b, upon that verification, computer 551 can generate Msg, a cryptographically secure message. Cryptographic operations (e.g., a digital signature) employed to secure this message can be performed locally by the computer application using cryptographic key(s) secured in the computer 551 white box of the application. The presence of a connected cryptographic token 552 enables the application to run, but securing the message does not require invoking the crypto token 552.

Execution of steps 506 through 509a provides a check for presence and validity of a connected (e.g., plugged-in) crypto-token. Although such a check can be executed correspondingly to each subsequent generation of a secure message (step 509b) in a 1:1 manner, the embodiments allow for considerably more flexibility. That is, generation of additional secure messages need not require execution of steps 506-509a to repeat for each secure message. For example, in some embodiments, each additional secure message can be generated according to a most recent check being successful. Many secure messages can be generated corresponding to just a single previous check. That is, one, or more than one verifiable message can be generated corresponding to the most recent successful check. Notably, subsequent to steps 500 through 505a and optionally 505b, the check can be performed frequently and/or periodically, and to a large degree independently of other processes taking place on computer 551.

In step 510, computer 551 provides message "Msg" to remote server 510. In step 511, remote server 553 verifies and decrypts the message. In response, remote server 553 can provide some service, such as a service to a computer 551 application. In step 512, remote server 553 communicates a successful result "Success" to computer 551. This communication can comprise data corresponding to a service provided by remote server 553.

In some embodiments, step 513 can test for presence of crypto token 552. By way of example and not limitation, such a test can comprise simply verifying electrical connection between a physical crypto token 552 and computer 551. If a test fails, computer 551 can responsively discontinue and/or alter program execution such as those of a computer 551 application depicted by steps of FIG. 5. Notably, in some embodiments, this test and resulting control flow can be performed frequently and/or periodically, and to a large degree independently of other processes taking place on computer 551.

In regard to FIG. 5, a cryptographic application and corresponding keys can be transformed by white box cryptography techniques known in the art, thereby providing a white box comprising a transformed cryptographic function and a transformed cryptographic key. Computer 551 can comprise the white box, as is depicted in FIG. 2 with a computing system 202 comprising a white box 204 and the white box embodying an application 203. Notably, the white box can comprise data and executable program that has been transformed prior to program execution. Further, data and executable program can undergo transformation during program execution. Some or all of the steps of FIG. 5 performed by computer 551 can be performed by the white box. Thus steps of FIG. 5 variously described as performed and/or interacting with computer 551 and/or the application can be described as performed and/or interacting with the computer 551 white box. Within FIG. 5, individual steps and/or combinations of steps can comprise one or more cryptographic functions and/or transformed cryptographic functions. For one example, the steps comprise cryptographic functions corresponding to provisioning of a secure communication channel employing cryptographic techniques. For another example, in step 505a, a symmetric session key K can be instantiated in the white box and employed to in the function of (re)computing a message authorization code (MAC) by employing an HMAC-SHA256 cryptographic algorithm or an AES-CMAC cryptographic algorithm.

In FIG. 5, cryptographic functions comprise symmetrical cryptography employing a common key. By way of example and not limitation, computer 551 and thus the white box of computer 551 employ a symmetric session key K. In the depicted steps, symmetric session key K undergoes a white box cryptography transformation at crypto token 552 in step 502. The transformed result, WBK, is conveyed to the computer 551 white box where it can undergo further transformations. The decryption of WBK at computer 551 white box to obtain K can be described as a transformation. Further, both WBK and K within a white box environment of computer 551 can undergo further transformations such as those securing data and executable code.

Steps 500 through 505b can be described as establishing, thus providing, a substantially secure channel between the computer 551 white box and the crypto token 552. Those steps can serve to provide the symmetric session key K that can be employed in securing a secure communications channel, to both crypto token 552 and computer 551.

The steps depicting interactions and messaging between computer 551 and crypto token 552, subsequent to step 505b, can be described as re-validating the presence of an authorized crypto token 552 as well as utilizing a white box that has been coupled with the crypto token 552 to request a secured service from a remote server. In some embodiments, for performance reasons, the secure channel between the computer 551 and crypto token 552 can be utilized to re-validate the token.

In some embodiments, step 513 can periodically determine the presence of crypto token 552 by employing a straightforward check for connectivity between computer 551 and crypto token 552. In some embodiments, crypto token 552 presence can alternatively and/or additionally be determined by the success of other interactions and confirmations between computer 551 and crypto token 552, as depicted by many of the steps in FIG. 5.

Although not an exhaustive list of such other interactions and confirmations, some examples are illustrative. In one example, a process for obtaining K from WBK in step 504 may not progress absent the presence of crypto token 552 supplying WBK in step 503a. In another example, verification of $MAC_K(TID|N_C|N_T)$ in step 505a may not progress absent the presence of crypto token 552 supplying parameters in step 503a. In another notable example, absent the presence of crypto token 552 supplying $N_T'$ and the computed $MAC_K(TID|N_C|N_T')$ in step 508, computer 551 can responsively discontinue and/or alter further program execution, if these items are not received in response to the transmission of a nonce in step 506. These alternative and/or additional interactions and confirmations can also be described as occurring periodically.

In step 510, computer 551 can provide a verifiable message "Msg" that can serve to initiate provision of a service by remote server 553. Step 511 depicts operations for verifying the message. The provisioning step 510 may require determination of the presence of crypto token 552 in order to progress. Thus provision of the verifiable message can be responsive to the presence of crypto token 552. Authentication methods herein disclosed rely on white box cryptographic implementations to protect cryptographic keys in software.

There are substantial challenges to securely tying a software image to a specific authorized computer. For example, an unauthorized computer identification might be artificially constructed from a hard disk serial number and a MAC address. Furthermore, in the case of embodiments of general purpose computers, items such as hard disks and MAC addresses typically must be subject to modification and/or upgrade. Thus, it can be desirable to provide and/or maintain authorization even over a change in computer identification.

Therefore, even a software image employing a white box crypto library and some mechanisms to protect software integrity may still be readily duplicated to many different computers. The use of a cryptographic token as described in these embodiments can restrict the operation of some software to an authorized computer operating in combination with a plugged-in cryptographic token.

Notably, the steps of FIGS. 4 and 5 can be accomplished using the embodiments depicted and described with regards to FIGS. 2 and 3. Computer 451 551 can correspond directly to computing system 202 302. Crypto token 452 552 can correspond directly to crypto token 205 305. Remote server 453 553 can correspond directly to remote server 207 307. With regards to FIGS. 4 and 5, steps attributed to computer 451 551 can be accomplished by a variety of software and/or hardware elements of computer 451 551. In some embodiments, a specific step or portion of a step can be described as performed by a specific element, such as an application. Although some specific embodiments may be as so described, the available embodiments disclosed herein are generally not so limited. For example, it can be appreciated that corresponding to a specific step, accomplishing a specific operation and/or set of operations can be attributed to specific applications, libraries, operating system functions, and/or other elements of computer 451 551 in a variety of ways. Further, in some embodiments, a specific operation and/or set of operations corresponding to a specific step can be accomplished by a combination of operations of elements of computer 451 551.

Figure 6:
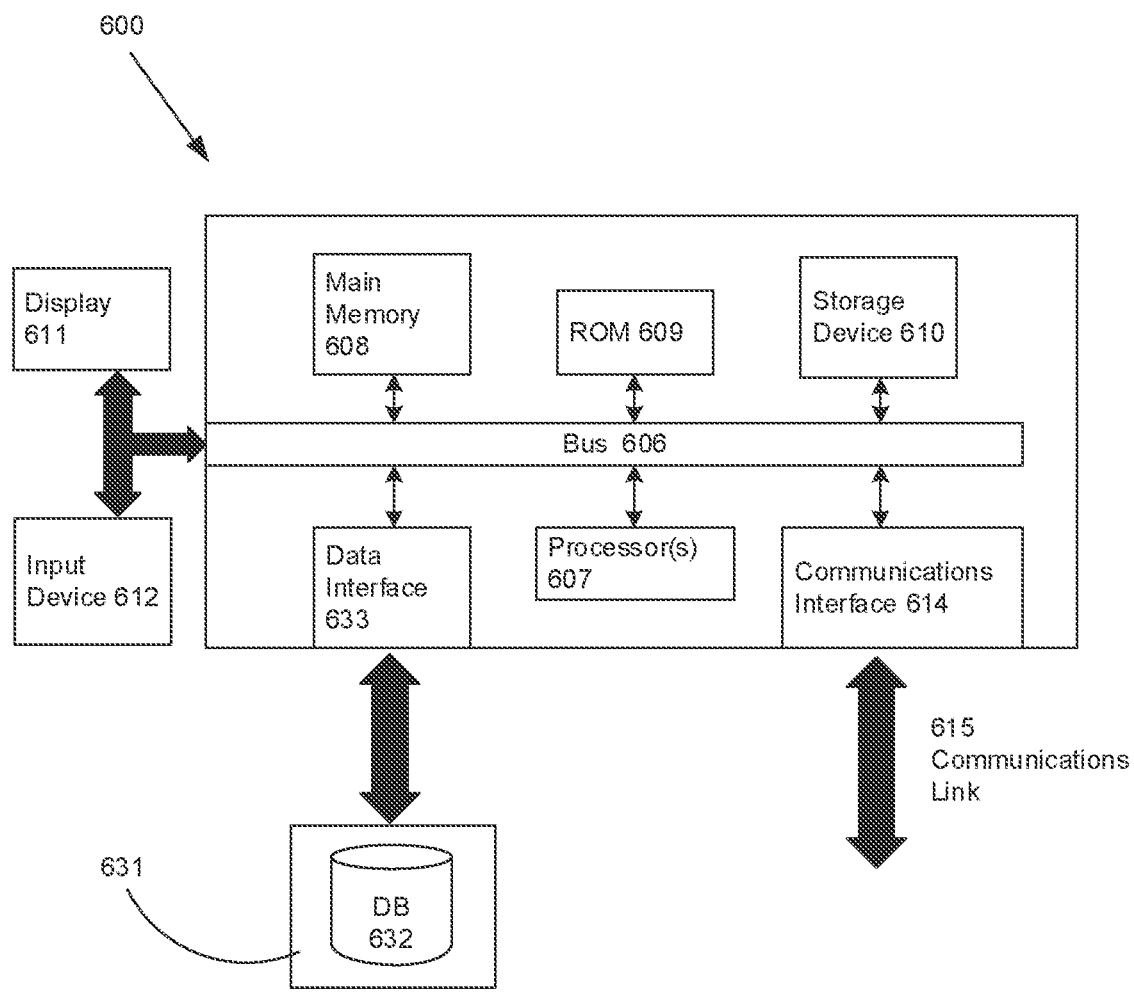
FIG. 6 depicts an exemplary computer system.

The execution of the sequences of instructions required to practice the embodiments can be performed by a computer system 600 as shown in FIG. 6. In an embodiment, execution of the sequences of instructions is performed by a single computer system 600. According to other embodiments, two or more computer systems 600 coupled by a communication link 615 can perform the sequence of instructions in coordination with one another. Although a description of only one computer system 600 will be presented below, however, it should be understood that any number of computer systems 600 can be employed to practice the embodiments.

A computer system 600 according to an embodiment will now be described with reference to FIG. 6, which is a block diagram of the functional components of a computer system 600. As used herein, the term computer system 600 is broadly used to describe any computing device that can store and independently run one or more programs. Each computer system 600 can include a communication interface 614 coupled to the bus 606. The communication interface 614 provides two-way communication between computer systems 600. The communication interface 614 of a respective computer system 600 transmits and receives electrical, electromagnetic or optical signals, that include data streams representing various types of signal information, e.g., instructions, messages and data. A communication link 615 links one computer system 600 with another computer system 600. For example, the communication link 615 can be a LAN, in which case the communication interface 614 can be a LAN card, or the communication link 615 can be a PSTN, in which case the communication interface 614 can be an integrated services digital network (ISDN) card or a modem, or the communication link 615 can be the Internet, in which case the communication interface 614 can be a dial-up, cable or wireless modem.

A computer system 600 can transmit and receive messages, data, and instructions, including program, i.e., application, code, through its respective communication link 615 and communication interface 614. Received program code can be executed by the respective processor(s) 607 as it is received, and/or stored in the storage device 610, or other associated non-volatile media, for later execution.

In an embodiment, the computer system 600 operates in conjunction with a data storage system 631, e.g., a data storage system 631 that contains a database 632 that is readily accessible by the computer system 600. The computer system 600 communicates with the data storage system 631 through a data interface 633. A data interface 633, which is coupled to the bus 606, transmits and receives electrical, electromagnetic or optical signals, that include data streams representing various types of signal information, e.g., instructions, messages and data. In embodiments, the functions of the data interface 633 can be performed by the communication interface 614.

Computer system 600 includes a bus 606 or other communication mechanism for communicating instructions, messages and data, collectively, information, and one or more processors 607 coupled with the bus 606 for processing information. Computer system 600 also includes a main memory 608, such as a random access memory (RAM) or other dynamic storage device, coupled to the bus 606 for storing dynamic data and instructions to be executed by the processor(s) 607. The main memory 608 also can be used for storing temporary data, i.e., variables, or other intermediate information during execution of instructions by the processor(s) 607.

The computer system 600 can further include a read only memory (ROM) 609 or other static storage device coupled to the bus 606 for storing static data and instructions for the processor(s) 607. A storage device 610, such as a magnetic disk or optical disk, can also be provided and coupled to the bus 606 for storing data and instructions for the processor(s) 607.

A computer system 600 can be coupled via the bus 606 to a display device 611, such as, but not limited to, a cathode ray tube (CRT) or a liquid-crystal display (LCD) monitor, for displaying information to a user. An input device 612, e.g., alphanumeric and other keys, is coupled to the bus 606 for communicating information and command selections to the processor(s) 607.

According to one embodiment, an individual computer system 600 performs specific operations by their respective processor(s) 607 executing one or more sequences of one or more instructions contained in the main memory 608. Such instructions can be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 607. Such a medium can take many forms, including, but not limited to, non-volatile, volatile and transmission media. Non-volatile media, i.e., media that can retain information in the absence of power, includes the ROM 609, CD ROM, magnetic tape, and magnetic discs. Volatile media, i.e., media that cannot retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object-oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Although exemplary embodiments of the invention have been described in detail above, those skilled in the art will readily appreciate that many additional modifications are possible in the exemplary embodiments without materially departing from the novel teachings and advantages of the invention. Accordingly, these and all such modifications are intended to be included within the scope of this invention construed in breadth and scope in accordance with the appended claims.

What is claimed is:

1. A method comprising the steps of:
providing a white box having an associated cryptographic function and an associated key;
the white box transforming each of the the cryptographic function and the key, thereby providing a transformed cryptographic function and a transformed cryptographic key;
providing a communications channel between the white box and a crypto token coupled with the white box, the white box authenticated to the crypto token using the transformed cryptographic key;
periodically determining presence of the crypto token; and,
providing a verifiable message, responsive to the presence of the crypto token, thereby initiating a service.

2. The method of claim 1 wherein the cryptographic function comprises asymmetrical cryptography employing a public/private key pair.

3. The method of claim 1, further comprising the steps of:
the white box computing a first public key corresponding to a first private key according to a Diffie-Hellman key agreement algorithm;
the crypto token computing a second public key corresponding to a second private key according to the Diffie-Hellman key agreement algorithm;
the white box computing a first value of a shared key responsive to the second public key and the first private key; and,
the crypto token computing a second value of the shared key responsive to the first public key and the second private key;
wherein the first and second values of the shared key are the same; and,
wherein authenticating the white box to the crypto token is further responsive to the first public key and the second public key.

4. The method of claim 1, further comprising the steps of:
the white box computing a first public key corresponding to a first private key according to an Elliptic Curve Diffie-Hellman key agreement algorithm;
the crypto token computing a second public key corresponding to a second private key according to the Elliptic Curve Diffie-Hellman key agreement algorithm;
the white box computing a first value of a shared key responsive to the second public key and the first private key; and,
the crypto token computing a second value of the shared key responsive to the first public key and the second private key;
wherein the first and second values of the shared key are the same; and,
wherein authenticating the white box to the crypto token is further responsive to the first public key and the second public key.

5. The method of claim 1:
wherein the cryptographic function comprises symmetrical cryptography employing a common key.

6. The method of claim 5:
wherein the crypto token is configured to provide a token identifier corresponding to the crypto token within a signed digital certificate; and,
wherein the white box is configured to validate the signed digital certificate and extract the token identifier.

7. The method of claim 6:
wherein the crypto token is further configured to provide a digital signature over a message;
wherein the signed digital certificate comprises a corresponding public key; and,
wherein the white box is configured to verify the digital signature, responsive to the corresponding public key.

8. The method of claim 5 further comprising the steps of:
periodically performing a check, thereby providing a most recent check, wherein the check determines presence and validity of the crypto token; and,
providing more than one verifiable message responsive to the most recent check.

9. The method of claim 5 further comprising the steps of:
the crypto token computing a first value of a message authentication code according to a HMAC-SHA256 algorithm;
the white box computing a second value of a message authentication code according to the HMAC-SHA256 algorithm; and,
determining a match of the first value and the second value;
wherein the presence of the crypto token is indicated by the match.

10. The method of claim 5 further comprising the steps of:
the crypto token computing a first value of a message authentication code according to an AES-CMAC algorithm;
the white box computing a second value of a message authentication code according to the AES-CMAC algorithm; and,
determining a match of the first value and the second value;
wherein the presence of the crypto token is indicated by the match.

* * * * *